July 20, 1937.  T. C. MYGLAND  2,087,651
VENTILATING STRUCTURE FOR AUTOMOBILE BODIES
Filed Oct. 9, 1933
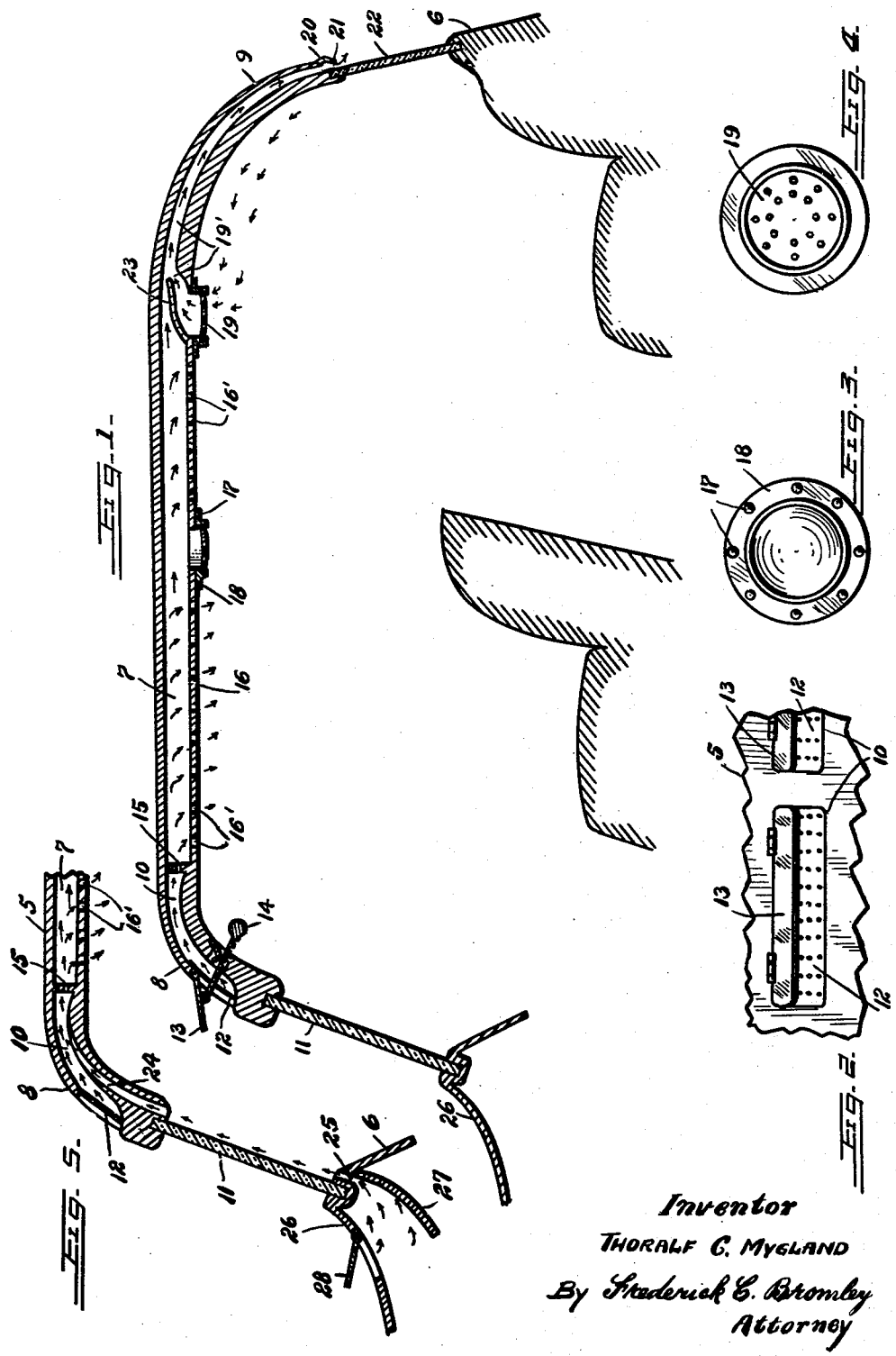
Inventor
THORALF C. MYGLAND
By Frederick E. Bromley
Attorney Patented July 20, 1937

2,087,651

UNITED STATES PATENT OFFICE 2,087,651

VENTILATING STRUCTURE FOR AUTOMOBILE BODIES

Thoralf C. Mygland, Whitby, Ontario, Canada

Application October 9, 1933, Serial No. 692,740
In Canada May 6, 1933

2 Claims. (Cl. 98—2)

The invention appertains to a closed body of an automobile and has for its object the production of an efficient and effective structure by which fresh air is admitted into the interior of the vehicle body and foul air drawn off. The invention provides for a controllable circulation system that does not discomfort the occupants by causing drafts within the vehicle body whilst changing the air. Regulating means are provided whereby the rate at which the air is changed can be varied to suit conditions.

In the preferred form of the invention the ventilating structure is built in the roof portion of the body and mainly comprises one or more air inlet passages leading into the roof of the body from the front upper portion and leading rearwardly so that forward motion of the vehicle will induce air to pass into the hollow or chambered part of the roof. The chambered portion of the roof is perforated interiorly over suitable areas in order that the fresh air may pass into the interior of the car body.

Towards the rear of the body the roof has an outlet passage or passages communicating with the atmosphere by being directed rearwardly with the roof contour and terminating at the rear extremity thereof. By this construction foul air is drawn off as fresh air circulates within the body interior. In the illustration the outlet has a venturi by which part of the introduced air passes completely through the hollow roof from front to rear and creates a suction to draw off foul air.

The amount of air allowed to pass into the car body for ventilation is governed by manually operable flaps.

In a slightly modified form of the invention special passages are arranged along the inner side of the bottom of the windshield through which air is directed from the customary cowl ventilator. The air is drawn upwardly through ducts in the roof by the suction of air through the chamber therein. The upward passage of air sweeps over the inner surface of the windshield and precludes moisture from collecting on the glass.

Figure 1 of the accompanying drawing is a general schematic view in section of an automobile body showing the invention applied thereto.

Figure 2 is a detail showing the inlet passages in the front of the roof.

Figure 3 is a plan view of a dome light having a perforated flange for fresh air to pass into the body interior.

Figure 4 is a dome outlet for foul air.

Figure 5 is a sectional view of a slightly modified form of the invention.

Like numerals of reference indicate corresponding parts in each of the figures throughout the drawing of the invention.

In the accompanying drawing, in which the preferred construction of the invention is illustrated, the roof 5 of the automobile body 6 has provided in it air passages generally denoted at 7. The modern sedan body has a gradually downwardly curved roof at the front as at 8 and an even more pronounced curve at the rear as at 9, of which advantage is taken in carrying out this invention.

The roof portion 8 is provided with one or more ducts 10 in the vertical sloping face of the roof that form air inlet passages which gradually curve upwardly into the air passages 7. These ducts extend horizontally above the windshield 11 and the orifices thereof may be supplied with reticulate members or foraminous plates 12 for the purpose of precluding entry of anything that would tend to clog the passages.

The ducts may be controlled in suitable manner by flaps or the like, which are shown by way of illustration as consisting of hinged members as at 13 disposed to swing outwardly to admit air. The members 13 are regulated by manually operable elements 14 that provide for adjustment in conventional manner.

A perforated plate 15 may be disposed between the ducts 10 and the passages 7, this, however, is entirely optional.

Perforations 16' are supplied in the ceiling 16 of the roof so as to place the passages 7 in communication with the interior of the body, and it is suggested that the customary dome light may have perforations 17 in its flange 18 to harmonize with dome outlets 19 located more to the rear of the body that enable foul air to pass off. It is suggested that two passages be supplied in the roof for admitting air into the hollow interior thereof and in this case two perforated dome outlets would be sufficient, one for each passage.

The dome outlets have ducts 19' leading rearwardly and downwardly to the rear extremity 20 of the roof and communicate with the atmosphere at 21 immediately over the rear window 22.

It is proposed that the passages 7 continue rearwardly into the passages or ducts 19 and that a deflecting wall 23 be provided over each outlet dome in order that as a portion of the fresh air passes through into the ducts 19 it will create a suction to draw off foul air.

From the foregoing description it will be evident that when the vehicle is travelling forwardly and the flaps 13 are open, air will pass into the passages and into the car body through the openings in the ceiling of the roof. A portion of the air, however, will pass directly to the outlet ducts and draw off foul air through the dome outlets 19. This assures a constant supply of fresh air for ventilation and the withdrawal of foul air without objectionable drafts.

In the modification shown in Figure 5 the ducts 10 are pierced by branch ducts 24 leading downwardly to the inner side of the windshield and coextensive therewith. Opposite to the branch ducts are ducts 25 extending across the lower portion of the windshield and communicating with the space beneath the cowl 26. A deflecting plate 27 is forwardly and downwardly curved in order to direct inflowing air from the usual cowl ventilator 28 to the ducts 25.

According to this construction air admitted by the cowl ventilator 28 is upwardly directed by the plate 27 through the ducts 25 over the inner face of the windshield. This air is sucked into the ducts 24 by the flow of air through the ducts 10. The circulation of air over the windshield keeps it free of moisture in damp, cool weather and in addition creates a more efficient circulation within the vehicle for removing vitiated air.

What I claim is:—

1. A ventilating structure for an automobile body comprising in combination, a roof having a draft duct extending therethrough, a branch duct communicating therewith and extending downwardly to the inside face of the windshield, a cowl ventilator, a deflecting plate positioned to the rear of the cowl ventilator, and ducts arranged in the body structure adjacent to the inner face of the windshield for the upward passage of air diverted by said deflecting plate.

2. A ventilating structure for an automobile body comprising in combination, a roof having a draft duct extending therethrough, a branch duct communicating therewith and extending downwardly to the inside face of the windshield, a cowl ventilator, a deflecting plate forwardly and downwardly curved from the lower portion of the windshield but spaced therefrom, said deflecting plate being disposed rearwardly of the cowl ventilator, and ducts arranged in the body structure between the lower portion of the windshield and the upper portion of the deflecting plate for the upward passage of air diverted by said deflecting plate.

THORALF C. MYGLAND.